United States Patent [19]

Briggs

[11] Patent Number: 5,023,707
[45] Date of Patent: Jun. 11, 1991

[54] SYSTEM FOR COMBINING MULTIPLE AUDIO CHANNELS INTO THE BASEBAND VIDEO SIGNAL AND THE RECOVERY OF THE AUDIO CHANNELS THEREFROM

[75] Inventor: James B. Briggs, La Canada, Calif.

[73] Assignee: Media Transference International, Ltd., Los Angeles, Calif.

[21] Appl. No.: 411,214

[22] Filed: Sep. 21, 1989

Related U.S. Application Data

[63] Continuation of Ser. No. 803,595, Dec. 2, 1985, abandoned.

[51] Int. Cl.$^5$ ............................................. H04N 5/76
[52] U.S. Cl. .................................. 358/343; 360/19.1
[58] Field of Search ................ 369/2; 360/30, 19.1; 358/341, 343

[56] References Cited

U.S. PATENT DOCUMENTS

| | | | |
|---|---|---|---|
| 3,952,154 | 4/1976 | Gates | 369/2 |
| 4,158,858 | 6/1979 | Janssen | 358/143 |
| 4,272,788 | 6/1981 | Ogita | 358/189 |
| 4,302,837 | 11/1981 | Tanaka | 358/144 |
| 4,339,772 | 7/1982 | Eilers | 358/144 |
| 4,353,090 | 10/1982 | Broadbent | 358/343 |
| 4,374,398 | 2/1983 | Yamashita | 358/143 |
| 4,464,684 | 8/1984 | Kluth | 358/343 |
| 4,564,868 | 1/1986 | Arafuze | 358/343 |
| 4,630,134 | 12/1986 | Kanamara | 360/19.1 |

*Primary Examiner*—Robert L. Richardson
*Attorney, Agent, or Firm*—Blakely Sokoloff Taylor & Zafman

[57] ABSTRACT

A system for enabling a plurality of audio signals respectively representing different languages to be recorded on a present-day video tape in a present day video tape recorder without requiring any additional space on the tape. The bands of audio signals representing the different languages are selectively reproduced so that anyone viewing the video program recorded on the video tape may select any one of a number of languages to accompany the video program. In accordance with the invention, the bands of audio signals representing the different languages are heterodyned to different frequency bands, and are caused to modulate a sub-carrier which, in turn, is inserted into the video signals representing the video content. This enables the audio signals to be recorded in the video tracks of the tape together with the video signals.

28 Claims, 3 Drawing Sheets

TAPE PATTERN

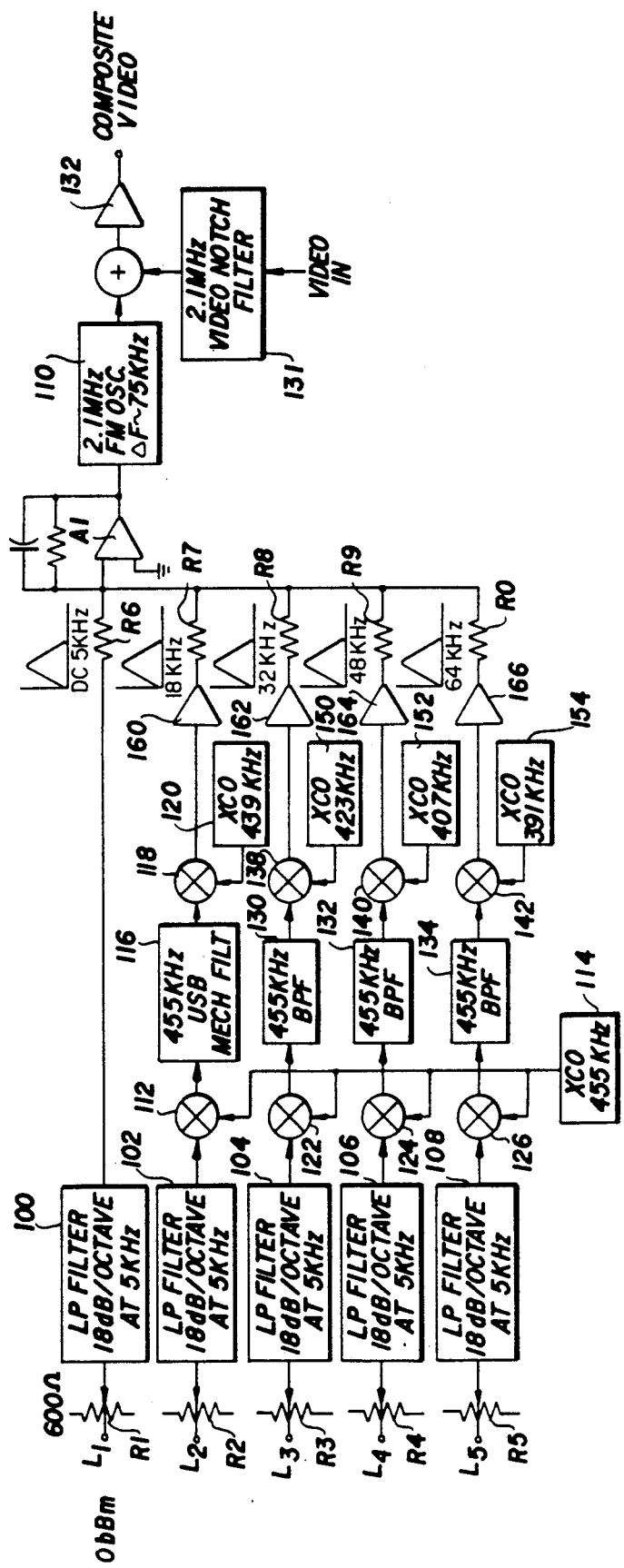
FIG. 3 AUDIO ENCODER
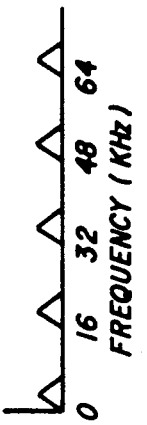
FIG. 4

SINGLE CHANNEL AUDIO DECODER, FM/SSB SUBCARRIERS WITH CRYSTAL SUBCARRIER OSCILLATOR

$F_{VCO} = 377.622$ KHz

NOTE: USE OF HORIZONTAL SYNC. DETECTOR OR 377 KHz CRYSTAL OSCILLATOR IS OPTIONAL

SYSTEM FOR COMBINING MULTIPLE AUDIO CHANNELS INTO THE BASEBAND VIDEO SIGNAL AND THE RECOVERY OF THE AUDIO CHANNELS THEREFROM

This is a continuation of application Ser. No. 06/803,595 filed Dec. 2, 1985 and now abandoned.

BACKGROUND OF THE INVENTION

There is a critical need on airlines, in hotels, and in schools, for a video cassette recording system in which the sound accompanying the video program may be reproduced in any selected one of a number of different languages.

A principal objective of the present invention is to provide an eminently simple system by which a plurality of different language audio signals may be recorded on a present-day video tape, in addition to the video program, and the conventional sound signals, and other information that is presently recorded on the video tape, without requiring any additional space on the tape.

Another objective of the invention is to provide a simple system for selecting and reproducing the video and different language audio signals recorded on the video tape, so that the audio signals may be reproduced in any selected one of a number of different languages.

BRIEF DESCRIPTION OF THE DRAWINGS

FIG. 3 is a block diagram showing the manner in which bands of audio signals representing different languages are inserted into the video signals representing the video program;

FIG. 4 is a diagram showing the frequency spectrum of the various bands of audio signals which are inserted into the composite video signals in accordance with the invention;

DETAILED DESCRIPTION OF THE ILLUSTRATED EMBODIMENT

Figure 1:
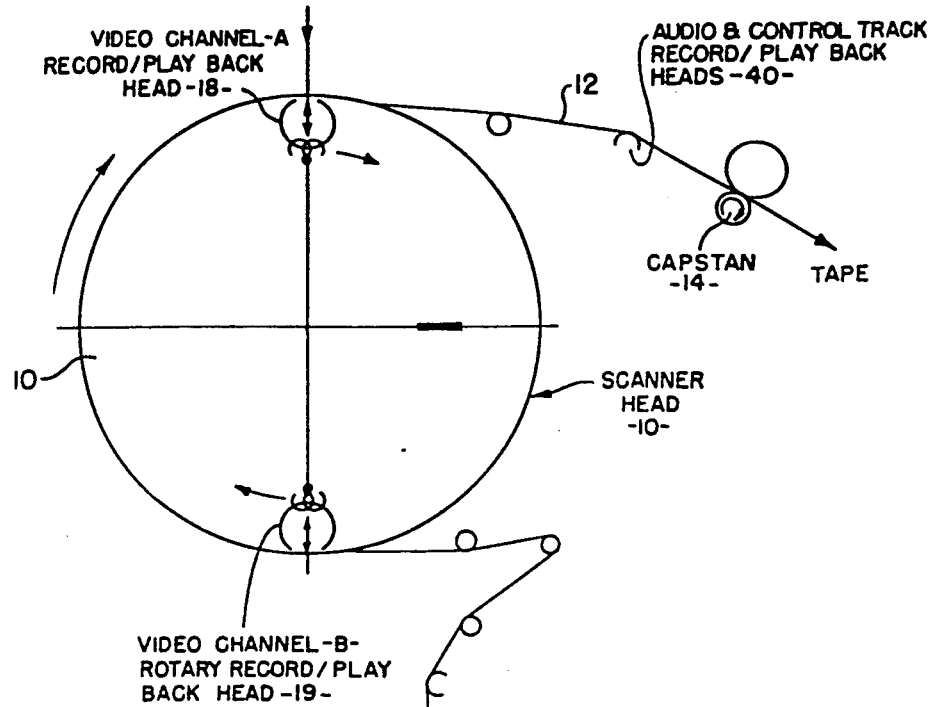
FIG. 1 is a schematic representation of the path followed by the video tape in a typical video cassette recorder, as the tape is drawn around a scanner head drum, and across various electromagnetic heads.

A typical present-day helical scan video cassette recorder, as shown in FIG. 1, includes a scanner drum 10 around which a video tape 12 is drawn by a capstan drive 14. The drum 10 has a pair of video record/playback heads 18 and 19 mounted on it displaced 180° from one another. These heads are caused to scan diagonally across the video tape, as the video tape is drawn around the drum. The system is synchronized so that during a recording operation, head 18 records a first field of video information on a first track extending diagonally across the tape (video track 1 in FIG. 2), and head 19 then records the second field of each frame of video information on an adjacent track extending diagonally across the tape (video track 2 in FIG. 2). This process continues in a series of diagonal video tracks extending across the tape as the recording process continues.

Figure 2:
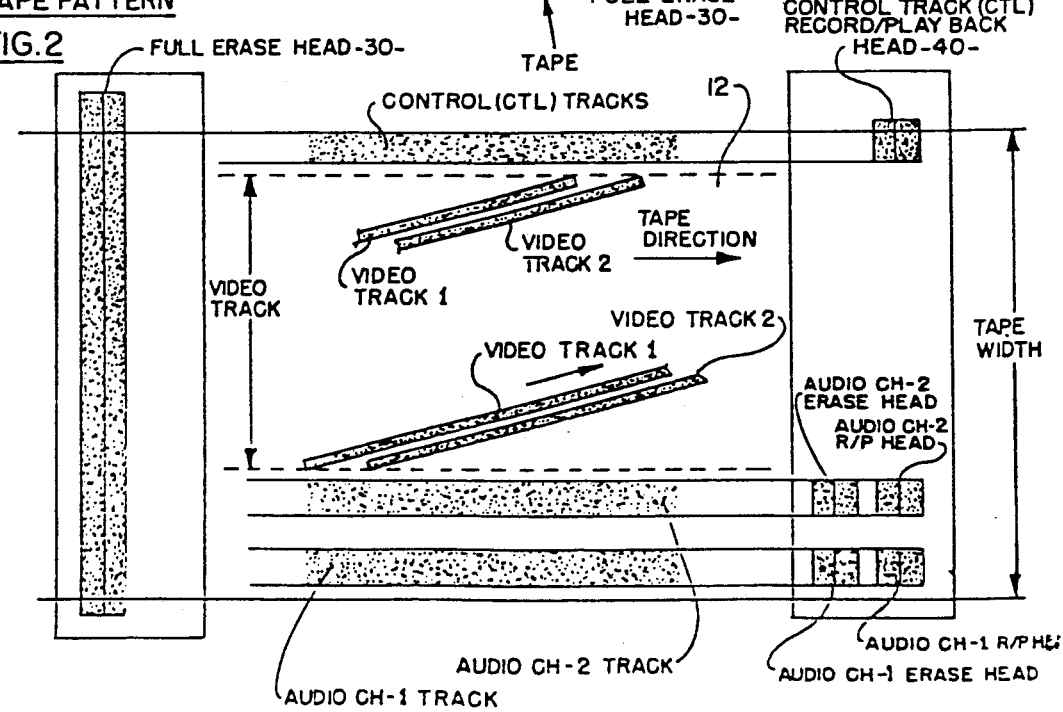
FIG. 2 is a schematic representation of a fragment of the video tape, showing the manner in which various signals are recorded on the tape in accordance with present-day practice.

As also shown in FIG. 2, it is usual to provide two tracks of audio information on the tape and, as mentioned above, the objective of the present invention is to enable additional tracks of audio information to be recorded without requiring any additional space on the tape. The two tracks of audio information designated in FIG. 2 as audio CH-1 track and audio CH-2 track. Audio signals on these tracks are read by audio record/playback heads designated audio CH-1 R/P head and audio CH-2 R/P head. These heads are preceded by respective erase heads designated audio CH-1 erase head and audio CH-2 erase head. An erase head 30 is also provided for erasing all the information from the tape when so desired.

In accordance with present-day practice, a control track is also provided on the video tape designated "control (CTL) tracks" in FIG. 2. Pulses are recorded in the control track, one pulse for each successive frame of video information. These pulses are recorded and reproduced by means, for example, of a magnetic head 40.

The diagram of FIG. 2 shows schematically the manner in which the different information is recorded on the video tape 12, and the positions of the various magnetic heads with respect to the recorded information. It will be observed from the diagram of FIG. 2 that the video information is recorded in successive video tracks extending diagonally across the tape, with a first video track and a second video track being included in each frame of video information, and with the video tracks being separated from one another.

During normal playback operation of the video cassette recorder, and when the video tape is proceeding at its normal play speed, the record/playback heads 18 and 19 are scanned along the diagonal tracks of the previously recorded video information in exact synchronization, so that the heads move relative to the individual video tracks without being displaced on either side of the tracks. At the same time, the audio heads reproduce the sound corresponding to the audio signals recorded in one or both of the audio tracks CH-1 and CH-2.

In accordance with the present invention, and as shown in FIG. 3, an audio encoder is provided which responds, for example, to five bands of audio signals, each representing a different language, for example, to cause all of the bands of audio signals to be inserted into the composite video signals which represent the video program to enable the composite video signals and the bands of audio signals to be recorded in the video tracks of a present day video tape recorder.

The five bands of audio signals are applied, for example, to input terminals L1–L5, and the amplitude of the signals in each band may be adjusted by manual adjustment of corresponding 600 ohm potentiometers designated R1, R2, R3, R4 and R5.

The audio signals in the various bands are then applied to similar low-pass filters 100, 102, 104, 106 and 108 so that each band is cut off, for example, at 5 KHz.

The output from filter 100 which represents a first band of audio signals extending from direct current to 5 KHz, as shown by the diagram in FIG. 3, and by the diagram in FIG. 4, is applied to an operational amplifier A1 through a resistor R6, and is caused to frequency modulate a frequency modulated oscillator 110.

The output from low-pass filter 102 is passed through a mixer 112 in which it is converted by a local oscillator 114 to occupy a band of frequencies centered above 455 KHz, or prefereably 452.5 KHz. The frequency band from the mixer 112 is passed through a mechanical or crystal filter 116 which converts the double sideband signal to a single sideband signal. The resulting band of signals from filter 116 is applied to a mixer 118, which is also driven by a signal at 439 KHz from crystal oscillator 120. The resulting signals from the mixer 118 extend in a band of frequencies from 16 KHz-21 KHz as indicated by the diagrams in FIGS. 3 and 4, and these signals are introduced through a resistor R7 to operational amplifier A1, and are caused to frequency modulate the frequency modulation oscillator 110.

In like manner, the band of signals from filter 104 are transformed to a frequency band of from 32 KHz to 37 KHz and also are caused to frequency modulate the oscillator 110; the band of signals from the filter 106 are converted to a band extending from 48 KHz to 53 KHz and are caused to frequency modulate oscillator 110. Finally, the band of signals from the filter 108 are converted to a band extending from 64 KHz to 69 KHz and are also caused to frequency modulate the oscillator 110. These signal bands are separated by increments of 15.734 KHz, which is the horizontal synchronizing frequency of the video system in order to minimize noise due to spurious beat frequencies.

As shown in FIG. 3, mixers 122, 124 and 126 are respectively connected to filters 104, 106 and 108; 455 KHz bandpass filters 130, 132 and 134 are respectively connected to mixers 122, 124 and 126. These bandpass filters may more accurately be centered at 452.5 KHz. They may be similar to filter 116. Mixers 138, 140 and 142 are respectively connected to the bandpass filters 130, 132 and 134.

Local oscillator 120 has a frequency of 439.266 KHz. Local oscillators 150, 152 and 154 are respectively connected to mixers 138, 140 and 142, and they have respective frequencies of 423.532 KHz, 407.798 KHz and 392.064 KHz.

Mixer 118 is connected to resistor R7 through an amplifier 160; mixer 138 is connected to operational amplifier A1 through an amplifier 162 and a resistor R8; mixer 140 is connected to operational amplifier A1 to an amplifier 164 and resistor R9; and mixer 142 is connected to the operational amplifier A1 through an amplifier 166 and a resistor R10.

The incoming composite video signals are passed through a video notch filter 131 which notches out a 2.1 MHz frequency band in the composite video signals. The output of the oscillator 110 represents a 2.1 MHz carrier signal which is frequency modulated by five bands of audio signals, as described above. The outputs from oscillator 110 and from filter 131 are added together and passed through an amplifier 132 to provide an output comprising the composite video signals into which five bands of audio signals have been inserted.

Figure 5:
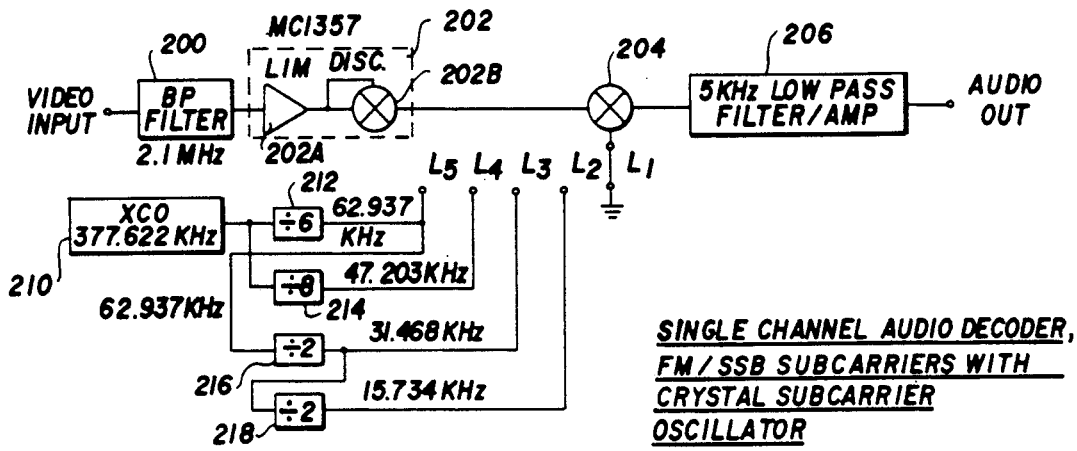
FIG. 5 is a block diagram showing the manner in which the various language signals may be derived from the video tape recorder and reproduced, the system of FIG. 5 providing for a selective reproduction of different languages, in accordance with the setting of a manually operated switch.

The different bands of audio signals recorded in the video tracks on the video tape may be selectively reproduced by the circuit of FIG. 5.

In that circuit, the video signals read from the tape by the heads 18 and 19 of FIG. 1 are passed through a bandpass filter 200 in FIG. 5 which passes the 2.1 MHz carrier of FIG. 3, and its side bands. As described in conjunction with FIG. 3, the carrier is frequency modulated by the various bands of audio signals. These signals may be demodulated by a detector circuit 202 which may be an integrated circuit of the type designated MC1357, and which includes a usual amplitude limiter 202A and a discriminator 202B. The resulting bands of audio signals are applied to a mixer 204, and the output of the mixer is passed through a 5 KHz low-pass filter amplifier 206 to an appropriate audio transducer.

A local oscillator 210 is provided having a frequency of 377.622 KHz, and its output is divided by various frequency dividers designated 212, 214, 216 and 218 to provide a series of output frequencies as shown. These output frequencies are applied to terminals designated L2, L3, L4 and L5, whereas terminal L1 is grounded. A manually operated switch contact selects each of the terminals L1, L2, L3, L4 and L5.

Figure 7:
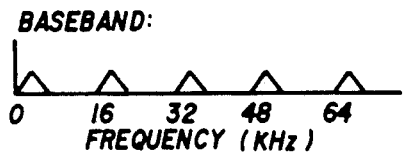
FIG. 7 is a diagram showing the frequency spectrum of the various bands of audio signals recovered from the video tape.

When the switching contact is on terminal L1, as shown in FIG. 5, the first band of audio signals extending from DC to 5 KHz is reproduced. Then, as the switch contact is selectively moved to terminals L2, L3, L4 and L5, the other bands of audio signals are selectively introduced. These bands are shown graphically in FIG. 7.

Figure 6:
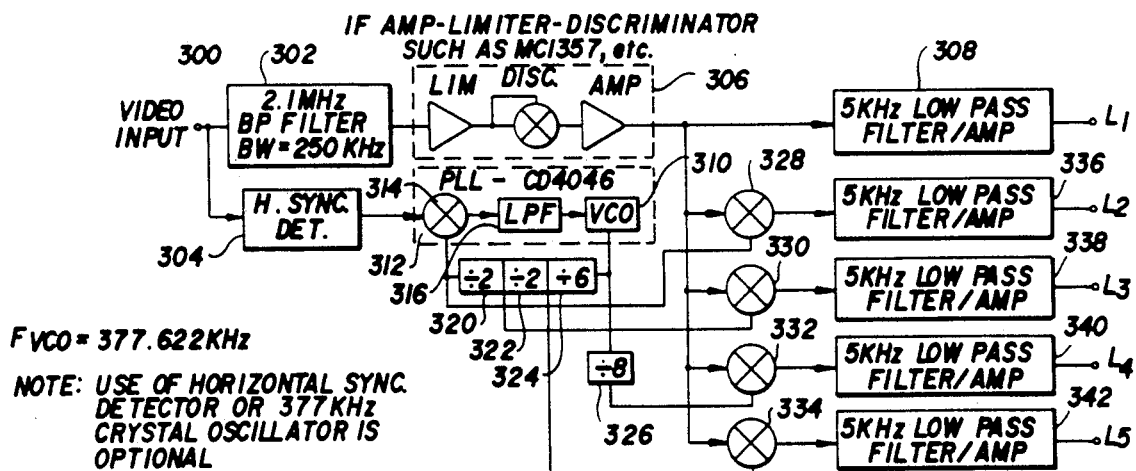
FIG. 6 is a block diagram for deriving the various language signals from the video tape recorder for simultaneous reproduction in different sound reproducers.

The circuit of FIG. 6 provides for the simultaneous reproduction of all of the bands of audio signals for reproduction in different transducers.

The composite video signal read from the tape by the heads 18 and 19 in FIG. 1 is applied to an input terminal 300. Terminal 300 is connected to a 2.1 MHz bandpass filter 302 similar to the filter 200 of FIG. 5, and having a bandwidth of 250 KHz. Terminal 300 is also connected to a detector 304 which detects the horizontal synchronizing signal components of the composite video signal.

The output of filter 302 is connected to an integrated circuit 304 which, like integrated circuit 202 of FIG. 5 may be of the type designated MC1357. Integrated circuit 304 serves to detect the bands of audio signals which are frequency modulated on the 2.1 MHz carrier from oscillator 110 of FIG. 3.

The output of integrated circuit 306 is connected to a 5 KHz low-pass filter/amplifier 308 similar to the filter/amplifier 206 of FIG. 3. The output of amplifier 308 represents the first band of audio signals, and may be reproduced by an appropriate transducer connected to output terminal L1.

The horizontal synchronizing pulses derived from detector 304 are used to control the frequency of a voltage controlled oscillator 310 which is included in an integrated circuit 312 of the type designated CD4046, together with a mixer 314 and a low-pass filter 316. The oscillator 310 is controlled to produce different frequency output signals by virtue of the frequency dividers designated 320, 322, 324 and 326. These different frequencies are applied to respective mixers 328, 330, 332 and 334, together with the output of integrated circuit 306.

The outputs of the mixers 328, 330, 332 and 334 correspond to the other bands of audio signals described in conjunction with FIG. 3, and these additional bands are passed through corresponding low-pass filters/amplifiers 336, 338, 340 and 342 to output terminals L2, L3, L4 and L5, to which appropriate transducers are connected.

The invention provides, therefore, a simple and economical system by which additional sound tracks may be recorded on an existing video tape, without requiring any additional space on the tape. As described above, these additional audio signals are recorded in the video tracks in a notch created in the video signals, the parameters of the notch being insufficient to cause any noticeable degradation in the video program.

It will be appreciated that while a particular embodiment of the invention has been shown and described, modifications may be made. It is intended in the claims to cover all modifications which come within the true spirit and scope of the invention.

I claim:

1. A method for encoding a plurality of audio signals, representative of audio in different languages, which correspond to a single video signal, said plurality of audio signals being encoded within the bandwidth of standard format composite video signal prior to the translation of a baseband video signal into a modulated format used for conduction, transmission and recording of a video signal said method comprising the steps of:
   allocating the audio signal representative of each language to a separate audio channel;
   filtering a predetermined frequency from the baseband video signal to remove energy from the baseband video signal at the predetermined frequency;
   modulating a carrier signal by the audio signals from the audio channels, said carrier signal having a frequency equal to the predetermined frequency; and
   inserting the modulated carrier signal at the predetermined frequency into the baseband video signal;
   whereby the audio signals representative of audio in different languages are encoded into the baseband video signal, thereby avoiding the addition of signals outside the baseband video signal and an increase in bandwidth of the signal, and the baseband video signal encoded with the audio signals can be subsequently conducted, transmitted or recorded using unmodified video transmission or recording equipment.

2. The method as described in claim 1, wherein the step of modulating the carrier signal further comprises the steps of:
   modulating intermediate carrier signals by the audio signals of the audio channels, each audio signal modulating a different intermediate carrier signal at a different frequency; and
   summing the modulated intermediate carrier signals; wherein the carrier signal is modulated by the summed modulated intermediate carrier signals.

3. The method as described in claim 2, wherein the intermediate carrier signals are generated at frequencies phase locked to the horizontal synchronizing signal of the composite video signal such that the intermediate carrier signals are at frequencies equal to a multiple of the horizontal synchronizing signal of the composite video signal.

4. The method as described in claim 1, wherein the predetermined frequency is in the luminance portion of the baseband video signal.

5. The method as described in claim 4, wherein the predetermined frequency is at 1.6 MHz.

6. The method as described in claim 1, further comprising a method for decoding the baseband video signal encoded with audio signals, comprising the steps of:
   separating the modulated carrier signal at the predetermined frequency from the baseband video signal;
   demodulating the modulated carrier signal at the predetermined frequency to retrieve at least one audio signal of an audio channel representative of a specific language.

7. The method as described in claim 3, further comprising a method for decoding the baseband video signal encoded with audio signals, comprising the steps of:
   separating the modulated carrier signal at the predetermined frequency from the video signal;
   demodulating the modulated carrier signal at the predetermined frequency to retrieve the plurality of modulated intermediate carrier signals;
   demodulating at least one of the modulated intermediate carrier signals to retrieve an audio signal of an audio channel representative of a specific language.

8. A method for encoding a plurality of audio signal, representative of audio in different languages, which correspond to a single video signal, said plurality of audio signals being encoded within the bandwidth of standard format composite video signal prior to the translation of a baseband video signal into a modulated format used for conduction, transmission and recording of a video signal, said method comprising the steps of:
   allocating each audio signal representative of each language to a separate audio channel;
   modulating intermediate carrier signals by the audio signals of the audio channels, each audio signal modulating a different intermediate carrier signal of a different frequency;
   summing the modulated intermediate carrier signals;
   filtering a predetermined frequency from the baseband video signal to remove energy from the baseband video signal at the predetermined frequency;
   modulating a carrier signal by the summed modulated intermediate carrier signals, said carrier signal having a frequency equal to the predetermined frequency;
   inserting the modulated carrier signal at the predetermined frequency into the baseband video signal;
   whereby the audio signals representative of audio in different languages are encoded into the basebond video signal, thereby avoiding the addition of signals outside the baseband video signal and an increase in bandwidth of the signal, and the baseband video signal encoded with the audio signals can be subsequently conducted transmitted or recorded using unmodified video transmission or recording equipment.

9. The method as described in claim 8, wherein the intermediate carrier signals are generated at frequencies phase locked to the horizontal synchronizing signal of the composite video signal such that the intermediate carrier signals are at frequencies equal to a multiple of the horizontal synchronizing signal of the composite video signal.

10. The method as described in claim 8, wherein the predetermined frequency is in the luminance portion of the baseband video signal.

11. The method as described in claim 9, wherein the predetermined frequency is at 1.6 MHz.

12. The method as described in claim 8, further comprising a method for decoding the baseband video signal encoded with audio signals, comprising the steps of:
- separating the modulated carrier signal at the predetermined frequency from the video signal;
- demodulating the modulated carrier signal at the predetermined frequency to retrieve the plurality of modulated intermediate carrier signals; and
- demodulating at least one of the modulated intermediate carrier signals to retrieve an audio signal of an audio channel representative of a specific language.

13. An apparatus for encoding a pluarlity of audio signals, representative of audio in different languages, which correspond to a single video signal, said plurality of audio signals being encoded within the bandwidth of standard format composite video signal prior to the translation of a baseband video signal into a modulated format used for conduction, transmission or recording of a video signal, said apparatus comprising:
- a plurality of audio channels to receive the audio signals, each channel receiving one audio signal representative of the audio in a predetermined language;
- a filter to remove energy from the baseband video signal at a predetermined frequency;
- a first oscillator to produce a carrier signal having a frequency equal to the predetermined frequency;
- a first modulating means to modulate the carrier signal at the predetermined frequency, said carrier signal being modulated by the audio signals of the audio channels; and
- means for inserting the modulated carrier signal at the predetermined frequency into the baseband video signal;
- whereby the audio signals representative of audio in different languages are encoded into the baseband video signal, thereby avoiding the addition of signals outside the baseband video signal and an increase in bandwidth of the signal, and the baseband video signal encoded with the audio signals can be subsequently conducted, transmitted or recorded using unmodified video transmission or recording equipment.

14. The apparatus as described in claim 13, further comprising:
- a plurality of second oscillators which produce a plurality of intermediate carrier signals at different frequencies; and
- a second modulating means to modulate the intermediate carrier signals by the audio signals received by the audio channels, each audio signal modulating a different intermediate carrier signal;
- whereby the modulated intermediate carrier signals modulate the carrier signal at the predetermined frequency.

15. The apparatus as described in claim 14, wherein the intermediate carrier signals are generated at frequencies phase locked to the horizontal synchronizing signal of the composite video signal such that the intermediate carrier signals are at frequencies equal to a multiple of the horizontal synchronizing signal of the composite video signal.

16. The apparatus as described in claim 15, wherein the predetermined frequency is in the luminance portion of the baseband video signal.

17. The apparatus as described in claim 16, wherein the predetermined frequency is at 1.6 MHz.

18. The apparatus as described in claim 14, wherein the second modulating means is an amplitude modulating means.

19. The apparatus as described in claim 13, wherein the first modulating means is a frequency modulating means.

20. The apparatus as described in claim 13, further comprising a means for decoding the baseband video signal to retrieve the encoded audio signals comprising:
- filter means for separating the modulated carrier signal at the predetermined frequency from the baseband video signal; and
- a first demodulating means for demodulating the modulated carrier signal at the predetermined frequency to retrieve at least one of the audio signals representative of a specific language.

21. The apparatus as described in claim 14, further comprising a means for decoding the baseband video signal to retrieve the encoded audio signals comprising:
- filter means for separating the modulated carrier signal at the predetermined frequency from the baseband video signal; and
- a first demodulating means for demodulating the modulated carrier signal at the predetermined frequency to retrieve the plurality of modulated intermediate carrier signals; and
- a second demodulating means for demodulating at least one of the modulated intermediate carrier signals to retrieve at least one audio signal of an audio channel representative of a specific language.

22. An apparatus for encoding a plurality of audio signals, representative of audio in different languages, which correspond to a single video signal, said plurality of audio signals being encoded within the bandwidth of a standard format composite video signal prior to the translation of a baseband video signal into a modulated format used for conduction, transmission or recording of a video signal said apparatus comprising:
- a plurality of audio channels to receive the audio signals, each channel receiving one audio signal representative of the audio in a predetermined language;
- a plurality of first oscillators which produce a plurality of intermediate carrier signals at different frequencies;
- a first modulating means to modulate the intermediate carrier signals by the audio signals received by the audio channels, each audio signal modulating a different intermediate carrier signal;
- summing means to sum the modulated intermediate carrier signals;
- a filter to remove energy from the base band video signal at a predetermined frequency;
- a second oscillator which produces a carrier signal at the predetermined frequency;
- a second modulating means to modulate the carrier signal at the predetermined frequency, said carrier signal being modulated by the summed modulated intermediate carrier signals;
- means for inserting the modulated carrier signal at the predetermined frequency into the baseband video signal;
- whereby the audio signals representative of audio in different languages are encoded into the baseband video signal, thereby avoiding the addition of signals outside the baseband video signal and an increase in bandwidth of the signal, and the baseband video signal encoded with the audio signals can be subsequently conducted, transmitted or recorded using unmodified video transmission or recording equipment.

23. The apparatus as described in claim 22, wherein the intermediate carrier signals are generated at frequencies phase locked to the horizontal synchronizing signal of the composite video signal such that the intermediate carrier signals are at frequencies equal to a multiple of the horizontal synchronizing signal of the composite video signal.

24. The apparatus as described in claim 22, wherein the predetermined frequency is in the luminance portion of the baseband video signal.

25. The apparatus as described in claim 24, wherein the predetermined frequency is at 1.6 MHz.

26. The apparatus as described in claim 22, wherein the first modulating modulating means is an amplitue modulating means.

27. The apparatus as described in claim 22, wherein the second modulating means is a frequency modulating means.

28. The apparatus as described in claim 22, further comprising a means for decoding the baseband video signal to retrieve the encoded audio signals comprising:
 filter means for separating the modulated carrier signal at the predetermined frequency from the baseband video signal; and
 a first demodulating means for demodulating the modulated carrier signal at the predetermined frequency to retrieve the plurality of modulated intermediate carrier signals; and
 a second demodulating means for demodulating at least one of the modulated intermediate carrier signals to retrieve at least one audio signal of an audio channel representative a specific language.

* * * * *

UNITED STATES PATENT AND TRADEMARK OFFICE
CERTIFICATE OF CORRECTION

PATENT NO. : 5,023,707
DATED : June 11, 1991
INVENTOR(S) : Briggs

It is certified that error appears in the above-indentified patent and that said Letters Patent is hereby corrected as shown below:

In column 6, claim 8 at line 24, please delete " signal " and insert -- signals --.

In column 6, claim 8 at line 49, please delete " basebond " and insert -- baseband --.

Signed and Sealed this

Ninth Day of September, 1997

Attest:

BRUCE LEHMAN

Attesting Officer

Commissioner of Patents and Trademarks